July 12, 1960 E. WILLIS 2,944,408
WATER FLOW-REGULATING VALVE FOR A HEAT PUMP
Filed Oct. 17, 1958 2 Sheets-Sheet 1
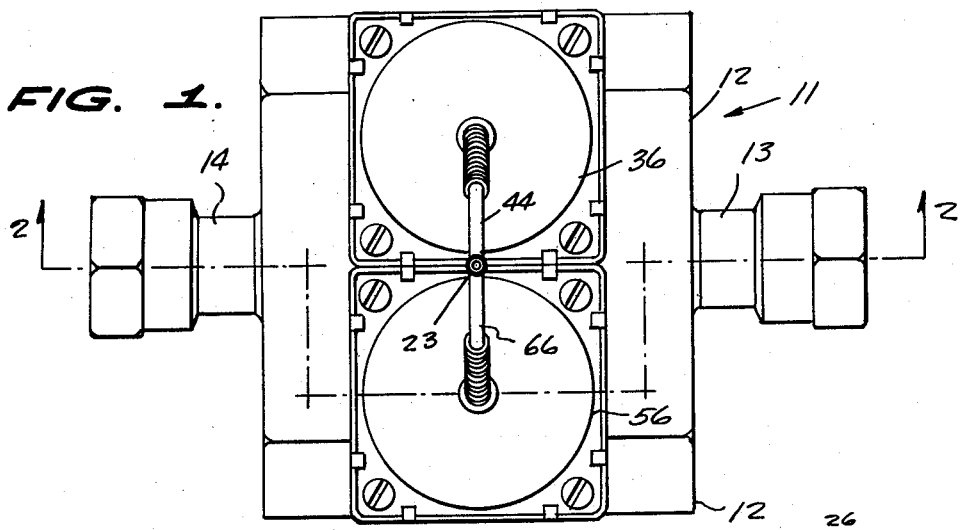
FIG. 1.
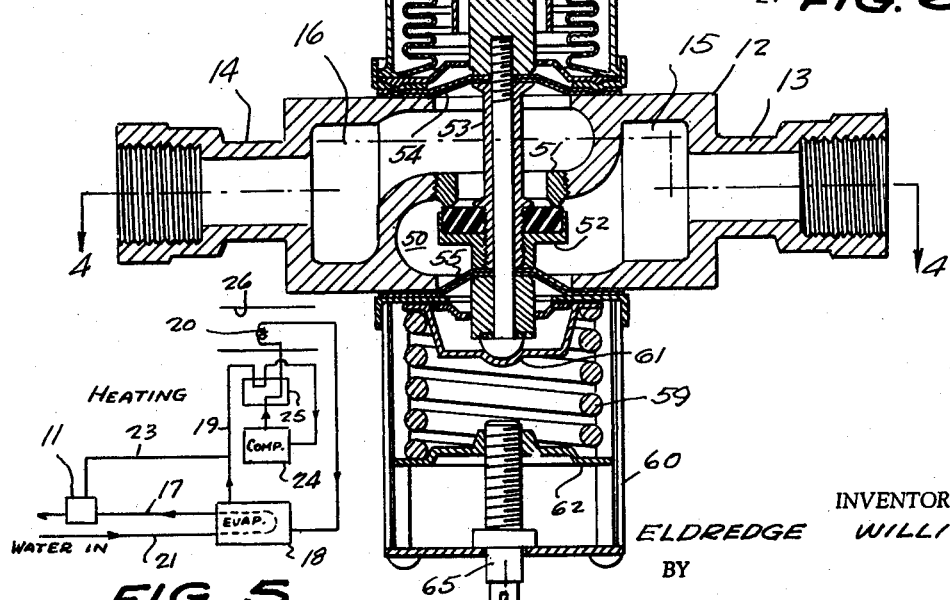
FIG. 2.
FIG. 5.
FIG. 6.
INVENTOR.
ELDREDGE WILLIS,
BY
McMorrow, Berman & Davidson
ATTORNEYS.

July 12, 1960 — E. WILLIS — 2,944,408

WATER FLOW-REGULATING VALVE FOR A HEAT PUMP

Filed Oct. 17, 1958 — 2 Sheets-Sheet 2

INVENTOR.
ELDREDGE WILLIS,
BY
McMorrow, Berman & Davidson
ATTORNEYS.

United States Patent Office 2,944,408
Patented July 12, 1960

2,944,408

WATER FLOW-REGULATING VALVE FOR A HEAT PUMP

Eldredge Willis, 218 E. Newell St., Winter Garden, Fla.

Filed Oct. 17, 1958, Ser. No. 767,957

3 Claims. (Cl. 62—160)

This invention relates to flow-regulating valves, and more particularly to a dual flow-regulating valve for regulating the rate of flow of water in a heat pump system, wherein the water is employed as a heat source or heat absorber, and wherein the flow of heat from the water to the system is regulated by controlling the rate of flow of the water.

A main object of the invention is to provide a novel and improved dual-control flow-regulating water valve for use in a heat pump system, said valve being simple in construction, being easy to install, and providing accurate control of the flow of the water in the system, eliminating waste of water and substantially improving the efficiency of the system by preventing waste of electric power which would otherwise be used to pump excessive amounts of water through the system.

A further object of the invention is to provide an improved dual valve for automatically controlling the flow of water in a heat pump system, the valve being inexpensive to manufacture, being durable in construction, being relatively compact in size, and being easy to adjust.

Further objects and advantages of the invention will become apparent from the following description and claims, and from the accompanying drawings, wherein:

Figure 1 is a top plan view of an improved dual control flow-regulating water valve constructed in accordance with the present invention.

Figure 2 is a vertical cross sectional view taken on the line 2—2 of Figure 1.

Figure 5 is a diagrammatic sketch of a heat pump arranged for heating and employing a water-flow-regulating valve in accordance with the present invention.

Figure 6 is a diagrammatic sketch of the heat pump of Figure 5, shown set up for air cooling.

Figure 3:
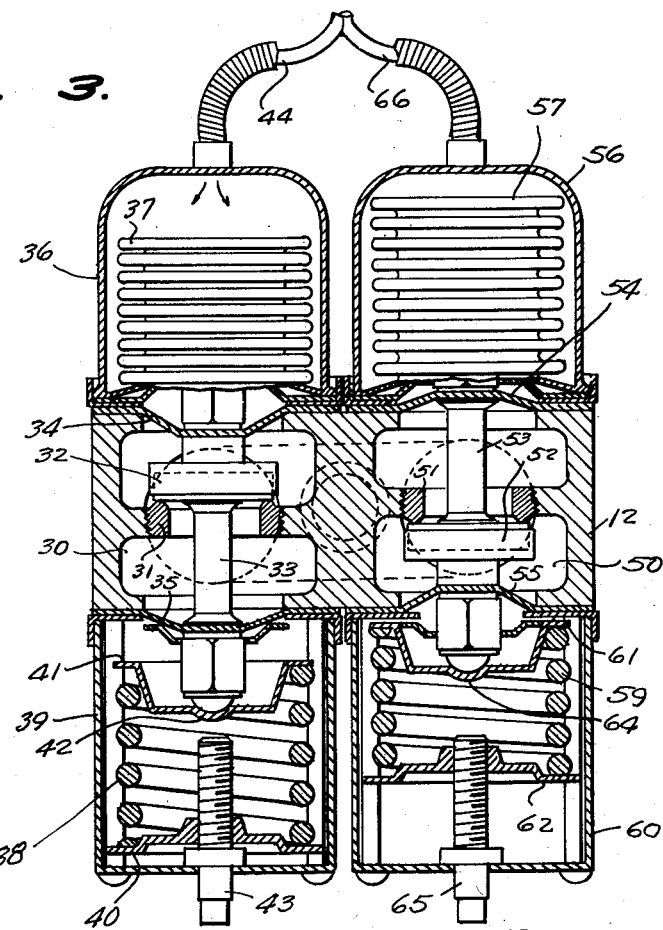
Figure 3 is a vertical cross sectional view taken on the line 3—3 of Figure 2.
Figure 4:
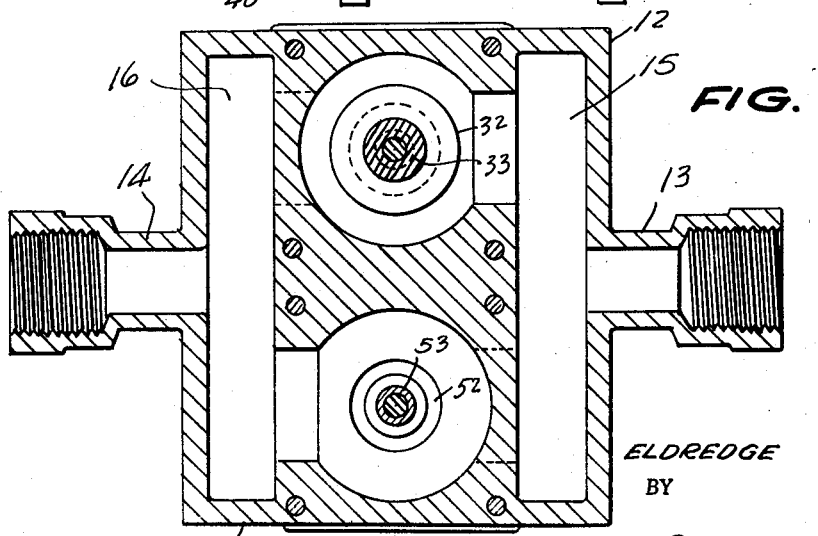
Figure 4 is a horizontal cross sectional view taken on the line 4—4 of Figure 2.

Referring to the drawings, the dual flow-regulating valve is designated generally at 11 and comprises a main housing 12 provided with a water inlet conduit 13 and an outlet conduit 14. The inlet conduit 13 communicates with a transversely extending water supply chamber 15 located at one side of housing 12, whereas the outlet conduit 14 communicates with a discharge chamber 16 located at the opposite side of housing 12.

The inlet conduit 13 is adapted to be connected to the return conduit from the heat exchange member 18 of a conventional heat pump which utilizes the heat contained in a water supply source. Thus, a suitable water supply source delivers water to the heat exchanger of the heat pump, wherein the heat is extracted from the water and thereafter is discharged to waste through a flow-regulating valve, in this case, the valve 11, whereby the rate of heat transfer depends upon the rate of flow of the water, and whereby the valve 11 may be employed to regulate the rate of transfer of heat to the heat exchange member of the heat pump system.

As will be well understood by those skilled in the art, where the heat pump system is employed for air cooling, the heat exchange member will then comprise the condenser of the system and the heat exchange member will then serve as a means for cooling the refrigerant in the condenser, namely, to transfer heat from the refrigerant to the water circulating through the condenser. Under these conditions, the rate of flow of the water will determine the rate at which heat is transferred thereto from the refrigerant, and thus, the control valve 11 will be employed to increase or decrease the rate of flow of water in accordance with the heat transfer requirement of the heat pump, employed as an air cooling device. On the other hand, when the heat pump is employed as an air heating device, the heat exchange member thereof becomes the evaporator of the system, in which case the refrigerant in the heat exchange member must be supplied with heat from the water supplied thereto, and wherein the rate of heat transfer to the refrigerant will depend upon the rate of flow of the water. Again, the valve 11 under these conditions will regulate the supply of heat to the refrigerant by regulating the rate of flow of the water therethrough, namely, by regulating flow between the inlet conduit 13 and the outlet conduit 14 of the valve in a manner presently to be described.

The heat pump system above mentioned is entirely conventional in construction, and in itself forms no part of the invention. However, it will be understood that the working pressure in the heat exchange member of the heat pump will be different under the two reverse conditions thereof, namely, when the heat pump is used for air heating and when the heat pump is used for air cooling.

Thus, when the heat pump system is employed for the purpose of cooling air, the heat exchange member with which the water is employed contains refrigerant which must be condensed, namely, which is at a relatively high pressure, since it is flowing from the high pressure side of the compressor and which is subsequently conveyed to the evaporator element of the system for expansion so as to provide a refrigerating effect on the air flowing therepast. On the other hand, when the heat pump is used for air heating, the heat exchange member thereof employing the water contains refrigerant which is at relatively low pressure, since said heat exchange member is employed as an evaporator and the refrigerant therein is conveyed to the input side of the compressor.

It will thus be seen that the refrigerant in the heat exchange member of the heat pump system will have two working ranges of pressure, depending upon whether the heat pump system is being employed for air heating or air cooling. These working pressures will appear in the outlet conduit 19 from the heat exchange member which leads to the compressor. As above mentioned, this conduit will in one case be connected to the high pressure side of the compressor (where the heat exchange member is employed as a condenser, namely for the condition where the heat pump is employed for air cooling), and in the other cases will be connected to the low pressure side of the compressor (where the heat exchange member is employed as an evaporator, and wherein the heat pump system is employed for air heating).

It will be further noted that the pressure in the conduit leading from the heat exchange member of the heat pump to the compressor will vary in accordance with the demands placed on the system. Thus, in the case where the heat pump is employed for air heating, and wherein the heat exchange member of the heat pump assumes the role of an evaporator, insufficient heat transfer from the water to the refrigerant in the heat exchange member will cause the pressure to drop in the conduit 19 leading from the heat exchange member to the compressor. Conversely, when excessive heat is being transferred from the water to the refrigerant, the pressure in said conduit will rise. The valve 11 is intended to respond to the pressure in this conduit 19 and to regulate the flow of water to the heat exchange member of the heat pump in accordance with the pressure of the refrigerant in said conduit 19, whereby the flow of water will depend only on the heat requirement of the space being heated.

Similarly, when the heat pump is employed for air cooling, the heat exchange member, being now in the role of a condenser, will be required to extract heat from the refrigerant at a rate depending upon the requirement of the space being air conditioned, and the valve 11 will act to regulate the flow of water to the heat exchange member of the heat pump in accordance with such requirement. Since the pressure of the refrigerant in the conduit connecting the heat exchange member to the compressor will vary in accordance with the demands for cooling of the air in the space being conditioned, the variation in pressure is employed to regulate the flow of water to the heat exchange member in accordance with such requirements.

Figure 5 schematically illustrates the arrangement of the heat pump when it is employed for heating, and wherein the heat exchange member, designated at 18, assumes the role of an evaporator, and the air heating member, shown at 20, acts as a condenser in the system. Water is supplied to the heat exchange member 18 by a water supply conduit 21, flowing through the heat exchange member and passing through the valve 11 which is installed in the water return conduit 17. The rate of flow of water is regulated by pressure-responsive valve means provided in the regulating valve 11, said pressure-responsive valve means being in communication with the refrigerant conduit 19 by a connecting conduit 23. As shown, the refrigerant conduit 19 is connected to the intake side of the compressor 24 through a reversible control valve 25 of conventional construction, which in Figure 5 is set in the position corresponding to use of the heat pump for heating, namely, for transferring heat from the element 20 to air moving therepast in a duct 26.

Figure 6 diagrammatically illustrates the heat pump arranged for air cooling. Under these conditions the valve 25 is set in a position wherein the conduit 19 is connected through valve 25 to the high pressure side of the compressor 24, and wherein the heat exchange member 18 is utilized as a condenser.

The water flow-regulating valve 11 comprises a pair of valves mounted in the body 12 between the inlet port 13 and the outlet port 14 and being arranged to control communication therebetween. Thus, the body 12 is formed at one side thereof with a chamber 30 provided with an annular valve seat 31, the chamber 30 connecting the chambers 15 and 16 and being provided with a vertically movable valve element 32 which is sealingly engageable on the valve seat 31. The valve element 32 is mounted on a stem 33 which is supported by a pair of flexible diaphragms 34 and 35 respectively mounted in the upper and lower portions of valve body 12, as is clearly shown in Figure 3, whereby the valve member 32 may move vertically relative to the annular seat 31. Secured on the valve body 12 above the valve element 32 is a pressure chamber 36 in which is mounted a bellows 37, said bellows having its top wall connected to the top end of the stem 33 whereby stem 33 moves downwardly responsive to increase of pressure in the chamber 36, causing the bellows 37 to contract. A coiled spring 38 is mounted in a sub-housing 39 secured to the main housing 12 below the diaphragm 35, said coiled spring 38 bearing between a bottom washer 40 and a top washer 41 slidably mounted in the sub-housing 39 and being vertically movable therein. The bottom end of the stem 33 bears on a central depression 42 formed in the washer member 41, whereby the coiled spring 38 exerts upward biasing force on the valve stem 33, tending to elevate the valve disc 32 relative to the seat 31. An adjusting screw 43 is rotatably mounted in the bottom wall of sub-housing 39, said adjusting screw being threadedly engaged with the bottom washer 40, whereby the normal tension of the coiled spring 38 may be adjusted externally of the sub-housing 39. A branch conduit 44 connects the top end of the pressure chamber 36 to the refrigerant pressure-sensing conduit 23.

A second valve assembly in housing 12 comprises a valve space 50 connecting cavity 15 to cavity 16 and provided with an annular valve seat 51 below which is disposed a valve element 52 mounted on a valve stem 53. The valve stem 53 is movably supported by respective upper and lower diaphragms 54 and 55 secured in the top and bottom portions of the housing 12, allowing the valve stem 53 to move vertically. A pressure chamber 56 is secured to housing 12 over the valve stem 53, said chamber containing a bellows 57 whose top wall is in operative abutting engagement with the top end of the stem 53.

The bottom rim of bellows 57 is secured to the bottom wall of the pressure chamber 56 so that the top wall of the bellows acts on the stem 53 to move the stem downwardly responsive to increases in pressure in the pressure chamber 56. A coiled spring 59 is mounted in a sub-housing 60 secured to the main housing 12 below the valve stem 53, the coiled spring 59 bearing between upper and lower washers 61 and 62. The upper washer 61 is engaged by the bottom end of the valve stem 53 at a central depression 64, as is clearly shown in Figure 3. An adjusting screw 65 is rotatably engaged through the bottom wall of sub-housing 60 and threadedly engages centrally in the bottom washer 62, whereby the normal tension of the coiled spring 59 may be adjusted. A conduit 66 connects the top end of pressure chamber 56 to the refrigerant pressure-sensing conduit 23.

As above mentioned, since the top wall of bellows 37 is in operative abutting engagement with the top end of the stem 33, increases in pressure in the pressure chamber 36 will act against the biasing force of coiled spring 38 and tend to move the valve element 32 downwardly, namely, toward sealing engagement on the annular valve seat 31. However, since the valve member 52 is below the annular valve seat 51 in the other valve assembly, increases in pressure in the chamber 56 will tend to move the valve stem 53 downwardly against the biasing force of the spring 59 and tend to move the valve element 52 away from its seat 51, opening the valve. However, the coiled spring 59 is of sufficient strength so that it is overcome only by the working pressures of the refrigerant in conduit 19 existing when the heat pump is set up for cooling, namely, in the conditions prevailing as diagrammatically illustrated in Figure 6. Thus, the valve element 52 sealingly engages its seat 51 when the heat pump is set up to provide heating, as diagrammatically illustrated in Figure 5.

Under the conditions illustrated in Figure 5 the valve element 52 engages the annular seat 51, closing off the right side of the regulating valve, as viewed in Figure 3. The spring 38 acts on valve stem 33 to elevate the valve member 32 from its seat 31, but responds to changes of refrigerant pressure in the pressure chamber 36 to decrease or increase the spacing between the valve element 32 and seat 31 in accordance with decreases or increases of the pressure of the refrigerant in conduit 19. As above mentioned, the changes of pressure of the refrigerant in conduit 19 occur as a result of changes in demand for heat to be extracted from the water supply through the conduit 21 to the heat exchange member 18. When the demand for heat decreases the pressure of the refrigerant in conduit 19 tends to increase, which causes increased pressure on the bellows 37, which therefore moves the valve element 32 downwardly towards its seat 31, thus automatically reducing the rate of flow of water through the heat exchange member 18. Conversely, an increase in demand for heat will lower the pressure in the refrigerant conduit 19, allowing the spring 38 to move the valve member 32 upwardly and away from the seat 31, allowing the rate of flow of the water supply to the heat exchange member 18 to increase.

When the heat pump is set up for air cooling, as in Figure 6, the conduit 19 is connected to the high pressure side of the compressor 24, whereby the fluid pressure in the chamber 36 is far in excess of that required to force valve element 32 into sealing engagement with its seat member 31. This closes the valve at the left side of the valve body 12, as viewed in Figure 3. This pressure is sufficient to overcome the force of the coiled spring 59, moving the valve element 52 at the right side of the valve body 12 in Figure 3 downwardly and away from its seat 51. Thus, under cooling conditions of use of the heat pump, the valve 32 is closed and the valve 52 is opened. Valve element 52 will be positioned in accordance with changes in cooling demand. Thus, if the demand for cooling increases, the pressure in the refrigerant conduit 19 will increase correspondingly, moving the valve element 52 downwardly to increase clearance between the valve element and its seat 51, whereby the rate of flow of water through the heat exchange member 18 is allowed to increase, and whereby more heat is extracted from the refrigerant by the water supplied to the heat exchange member 18 through the conduit 21. Conversely, when the demand for cooling decreases, the pressure in the refrigerant conduit 19 decreases correspondingly and coiled spring 59 acts to move element 52 towards its seat 51, decreasing the rate of flow of water through the heat exchanger 18.

Under conditions where the heat pump is not being used, the pressures in the chambers 56 and 36 equalize at a value which is insufficient to oppose the spring 59 but which is sufficient to overcome the force of spring 38. Both valve elements 52 and 32 therefore close, completely cutting off the flow of water through the heat exchange member 18, whereby the water flow is automatically discontinued when the heat pump system is not in operation.

As will be readily apparent, the valve member 11 thus acts to automatically regulate the flow of water through the heat exchange member 18 of the heat pump and to automatically discontinue said flow when the heat pump is not in operation. This eliminates the necessity for manual control of the water supply to the heat pump, as well as manual adjustment of the rate of flow of water under varying demand conditions.

While a specific embodiment of an improved water control valve for a heat pump has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a heat pump, a refrigeration compressor, a refrigerant conduit, means to selectively connect said conduit to the high pressure side or the low pressure side of the compressor, in accordance with operation of the heat pump for cooling or heating, a heat exchange water conduit, a dual water control valve in said heat exchange water conduit, said dual control valve comprising a body formed with a water inlet port and a water outlet port, a pair of valves mounted in said body between said inlet and outlet ports and being constructed and arranged to control communication therebetween, means acting on one of said valves and biasing same toward closed position, first fluid pressure-responsive means connected to said one valve in opposition to said biasing means and being constructed and arranged to open said one valve responsive to a relatively high predetermined range of fluid pressures therein, corresponding to operation of the heat pump for cooling, means in the other valve biasing same toward open position, second fluid pressure-responsive means connected to said other valve in opposition to said second-named biasing means and being constructed and arranged to move said other valve toward closing position responsive to a relatively low range of fluid pressures corresponding to operation of the heat pump for heating, and conduit means connecting both said fluid pressure-responsive means to said refrigerant conduit, whereby to control communication between said inlet and outlet ports in accordance with the respective working fluid pressures in the refrigerant conduit corresponding to heating and cooling.

2. In a heat pump, a refrigeration compressor, a refrigerant conduit, means to selectively connect said conduit to the high pressure side or the low pressure side of the compressor, in accordance with operation of the heat pump for cooling or heating, a heat exchange water conduit, a dual water control valve in said heat exchange water conduit, said dual control valve comprising a body formed with a water inlet port and a water outlet port, a pair of valves mounted in said body between said inlet and outlet ports and being constructed and arranged to control communication therebetween, means acting on one of said valves and biasing same toward closed position, a first fluid chamber, a first bellows in said first chamber, means connecting said first bellows to said one valve and acting to open said one valve in response to relatively high fluid pressures in said first fluid chamber corresponding to operation of the heat pump for cooling, means in the other valve biasing same toward open position, a second fluid chamber, a second bellows in said second fluid chamber, means connecting said second bellows to said other valve and acting to move said other valve toward closing position responsive to a relatively lower range of fluid pressures in said second fluid chamber corresponding to operation of the heat pump for heating, and conduit means connecting both of said fluid chambers to said refrigerant conduit, whereby to control communication between said inlet and outlet ports in accordance with the working fluid pressures in the refrigerant conduits corresponding to heating and cooling.

3. In a heat pump, a refrigeration compressor, a refrigerant conduit, means to selectively connect said conduit to the high pressure side or the low pressure side of the compressor, in accordance with operation of the heat pump for cooling or heating, a heat exchange water conduit, a dual water control valve in said heat exchange water conduit, said dual control valve comprising a body formed with a water inlet port and a water outlet port, a pair of valves mounted in said body between said inlet and outlet ports and being constructed and arranged to control communication therebetween, a first coiled spring mounted in said body, bearing means disposed between said first coiled spring and one of said valves and transmitting force thereto from said first coiled spring to bias the valve toward closed position, a first fluid chamber, a first bellows in said first fluid chamber, means connecting said first bellows to said one valve and acting to open said one valve responsive to a relatively high predetermined range of fluid pressures in said first fluid chamber corresponding to operation of the heat pump for cooling, a second coiled spring mounted in said body, bearing means disposed between said second coiled spring and the other valve and transmitting force thereto from said second coiled spring to bias said other valve to open position, a second fluid chamber, a second bellows in said second fluid chamber, means connecting said second bellows to said other valve and acting to move said other valve toward closing position responsive to a relatively low range of fluid pressures in said second fluid chamber corresponding to operation of the heat pump for heating, and conduit means connecting both of said fluid chambers to said refrigerant conduits, whereby to control communication between said inlet and outlet ports in accordance with the working fluid pressures in the refrigerant conduit corresponding to heating and cooling.

References Cited in the file of this patent

UNITED STATES PATENTS

| | | |
|---|---|---|
| 1,601,477 | Kritzer | Sept. 28, 1926 |
| 2,216,245 | Larson | Oct. 1, 1940 |
| 2,495,272 | Lum | Jan. 24, 1950 |
| 2,778,570 | Carson | Jan. 22, 1957 |
| 2,784,738 | Thurber | Mar. 12, 1957 |